(12) United States Patent
Albers

(10) Patent No.: US 6,516,018 B2
(45) Date of Patent: *Feb. 4, 2003

(54) CORROSIVE RESISTANT PLATED ELECTRODE FOR A RLG

(75) Inventor: Steven C. Albers, Coon Rapids, MN (US)

(73) Assignee: Honeywell International Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,097

(22) Filed: May 4, 1999

(65) Prior Publication Data

US 2003/0002558 A1 Jan. 2, 2003

(51) Int. Cl.$^7$ ................................................. H01S 3/097
(52) U.S. Cl. ............................................ 372/87; 372/94
(58) Field of Search ................................. 372/87, 38.05, 372/29.013, 94

(56) References Cited

U.S. PATENT DOCUMENTS

| | | | | |
|---|---|---|---|---|
| 4,612,647 A | * | 9/1986 | Norvell | 372/88 |
| 4,727,638 A | * | 3/1988 | Altmann et al. | 29/417 |
| 4,821,281 A | * | 4/1989 | Lind et al. | 372/94 |
| 4,865,436 A | * | 9/1989 | Ahonen et al. | 350/487 |
| 5,168,504 A | * | 12/1992 | Ford | 372/87 |
| 6,072,580 A | * | 6/2000 | Barnes et al. | 356/350 |

* cited by examiner

Primary Examiner—Paul Ip
Assistant Examiner—Davienne Monbleau
(74) Attorney, Agent, or Firm—Dennis C. Bremer

(57) ABSTRACT

A ring laser gyro uses electrodes plated with a high corrosive resistant material to extend the life of the ring laser gyro. The material creates an environment that will prevent degradation of the ring laser gyro cathode and the mirrors which in turn will lengthen the life of a ring laser gyro.

18 Claims, 2 Drawing Sheets

CORROSIVE RESISTANT PLATED ELECTRODE FOR A RLG

BACKGROUND OF THE INVENTION

In ring laser gyros it is important for obvious reasons to have a gyro with a long lifetime. Presently, ring laser gyros have a ring laser gyro block with two anodes, a cathode and mirrors placed at the ends of the ring laser gyro block. A laser cavity exists for lasing to operate the ring laser gyro. In the past, electrodes were made with a corrosive material such as Invar, a nickel/steel alloy. In the oxidation process of the corrosive material, the material would take away a lot of oxygen in the ring laser gyro which degraded the cathode and mirror environment and in turn degraded the cathode and the mirrors. As a result of the shortened life of the cathode or the mirrors, the life of the ring laser gyro was shortened as well. It would be beneficial to create a cathode and mirror environment that did not degrade the cathode or the mirrors so that the life of the gyro could be extended.

SUMMARY OF THE INVENTION

A ring laser gyro uses electrodes plated with a high corrosive resistant material to extend the life of the ring laser gyro. The material creates an environment in the ring laser gyro that will prevent degradation of the ring laser gyro cathode and the mirrors which in turn will lengthen the life of a ring laser gyro.

DETAILED DESCRIPTION OF THE PRESENT INVENTION

Figure 1:
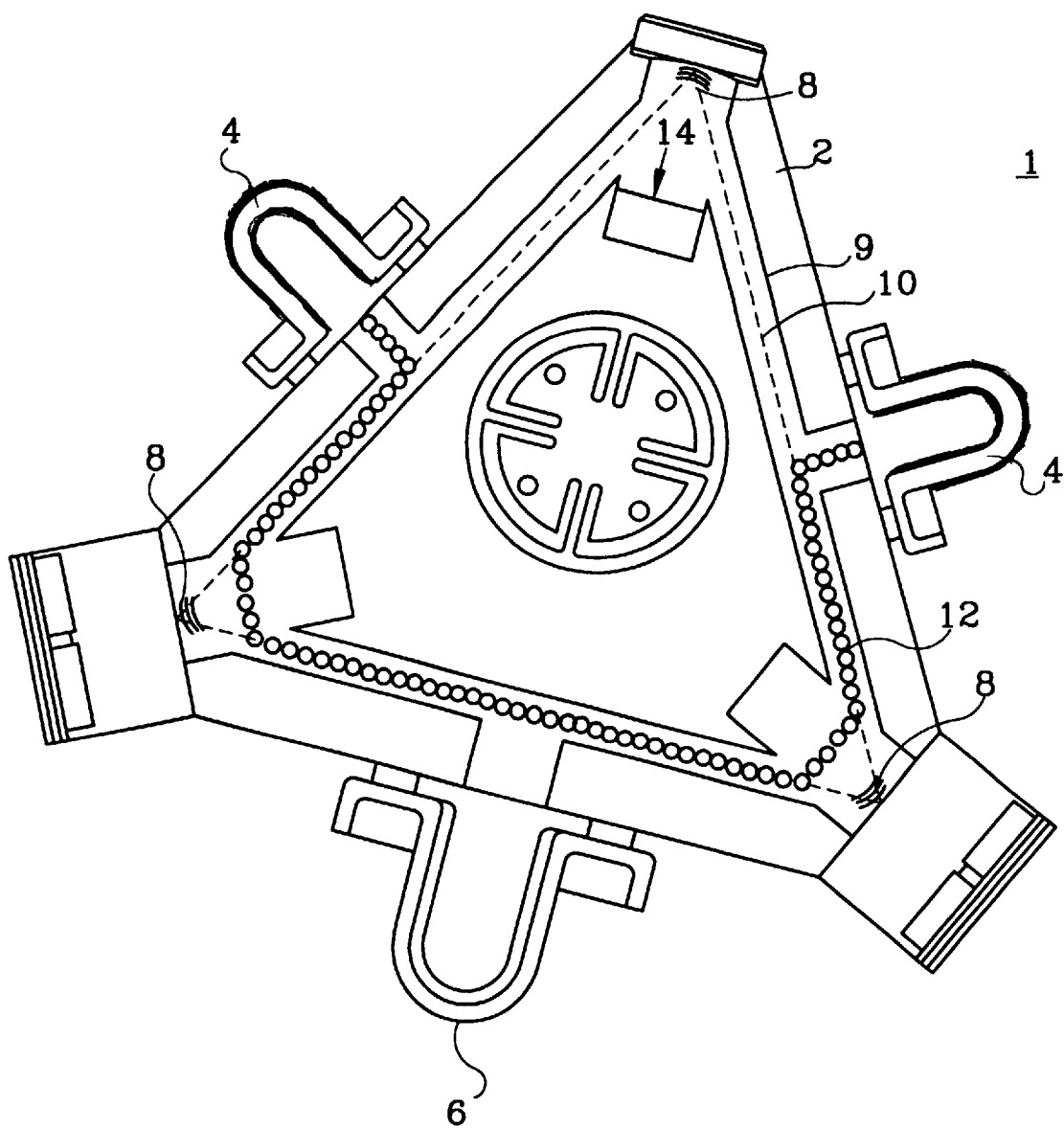
FIG. 1 shows a cut away top view of a ring laser gyro of the present invention.

The present invention is shown in FIG. 1. The ring laser gyro 1 has a ring laser gyro block 2, anodes 4, a cathode 6 and mirrors 8. Also, the laser cavity 9 is shown where lasing occurs to create laser beams 10 in the ring laser gyro 1. Before, as described in the background of the invention, the corrosive material of the electrodes 4 would act as an oxygen sink taking oxygen away from the cathode and mirror environment. It has been discovered that this environment degraded the cathode 6 and the mirrors 8. The cathode 6 and the mirrors 8 actually require a small amount of oxygen to react with the environment which will result in a longer life for the cathode 6 and the mirrors 8 and thus, the ring laser gyro 1. Therefore, a small amount of oxygen is required in the environment.

The present invention uses the old corrosive electrode material and plates it with a high corrosive resistant material. The process to plate the material onto the electrodes 4 is well known in this area of technology and will not be discussed in any further detail. The material used in the present invention could be a nickel/steel alloy such as Invar, gold or aluminum, but any high corrosive resistant material could be used. This material does not take away all the oxygen in the environment and allows the oxygen to diffuse in the laser cavity 9. Oxygen in the laser cavity 9 now reacts with the cathode 6 and the mirrors 8 instead of the electrodes 4 and this reaction with the oxygen will extend the life of the cathode 6 and the mirrors 8 and thus, the life of the ring laser gyro 1.

The invention has been described herein in considerable detail in order to comply with the Patent Statutes and to provide those skilled in the art with the information needed to apply the novel principles and to construct and use such specialized materials and components as are required. However, it is to be understood that the invention can be carried out by specifically different materials and components, and that various modifications, both as to the processing details and operating procedures, can be accomplished without departing from the scope of the invention itself.

The embodiments of the invention in which an exclusive property or right is claimed are defined as follows:

1. A ring laser gyro comprising:
    a ring laser gyro block; and
    at least first and second anodes, wherein each of the at least first and second anodes has an external surface and an internal surface, wherein the at least first and second anodes are placed on corresponding sides of the ring laser gyro block, wherein each of the at least first and second anodes comprises a corrosive material covered with a non-corrosive material, and wherein the non-corrosive material covers at least the internal surfaces of the at least first and second anodes so as to inhibit corrosion of at least the internal surfaces of the at least first and second anodes.

2. The ring laser gyro of claim 1 wherein the at least first and second anodes are placed in the middle of the sides of the ring laser gyro block.

3. The ring laser gyro of claim 1 wherein the corrosive material comprises a nickel/steel alloy.

4. The ring laser gyro of claim 1 wherein the non-corrosive material comprises gold.

5. The ring laser gyro of claim 1 wherein the non-corrosive material comprises aluminum.

6. The ring laser gyro of claim 1 wherein the non-corrosive material covers both the internal surface and the external surface of the at least first and second anodes.

7. An apparatus comprising a ring laser gyro having an anode at a surface of the ring laser gyro, wherein the anode comprises a corrosive material and a non-corrosive material, wherein the corrosive material has an internal surface and an external surface, and wherein the non-corrosive material covers the internal surface of the corrosive material so as to inhibit corrosion of the internal surface of the corrosive material of the anode.

8. The apparatus of claim 2 wherein the corrosive material comprises Invar.

9. The apparatus of claim 7 wherein the non-corrosive material comprises gold.

10. The apparatus of claim 7 wherein the non-corrosive material comprises aluminum.

11. The apparatus of claim 7 wherein the non-corrosive material covers both the internal surface and the external surface of the corrosive material.

12. A ring laser gyro, comprising:
    a ring laser gyro block having a plurality of sides; and
    an electrode at one of the sides of the ring laser gyro block, wherein the electrode comprises a corrosive material, and wherein the electrode further comprises a corrosive resistant material covering a surface of the corrosive material so as to inhibit corrosion of the surface of the corrosive material of the electrode.

13. The ring laser gyro of claim 12 wherein the corrosive material comprises a nickel/steel alloy.

14. The ring laser gyro of claim 12 wherein the corrosive resistant material comprises aluminum.

15. The ring laser gyro of claim 12 wherein the corrosive resistant material comprises gold.

16. The ring laser gyro of claim 12 wherein the corrosive material has an external surface and an internal surface, and wherein the corrosive resistant material covers the internal surface of the corrosive material.

17. The ring laser gyro of claim 12 wherein the corrosive material has an external surface and an internal surface, and wherein the corrosive resistant material covers the external surface of the corrosive material.

18. The ring laser gyro of claim 12 wherein the corrosive material has an external surface and an internal surface, and wherein the corrosive resistant material covers both the internal surface and the external surface of the corrosive material.

* * * * *

UNITED STATES PATENT AND TRADEMARK OFFICE
CERTIFICATE OF CORRECTION

PATENT NO. : 6,516,018 B2
DATED : February 4, 2003
INVENTOR(S) : Steven C. Elbers It is certified that error appears in the above-identified patent and that said Letters Patent is hereby corrected as shown below:

Column 1,
Line 59, delete reference to -- a nickel/steel alloy such as Invar, --

Claim 8 should be dependent on claim -- 7 --.

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,516,018 B2
DATED : February 4, 2003
INVENTOR(S) : Albers

Figure 2:
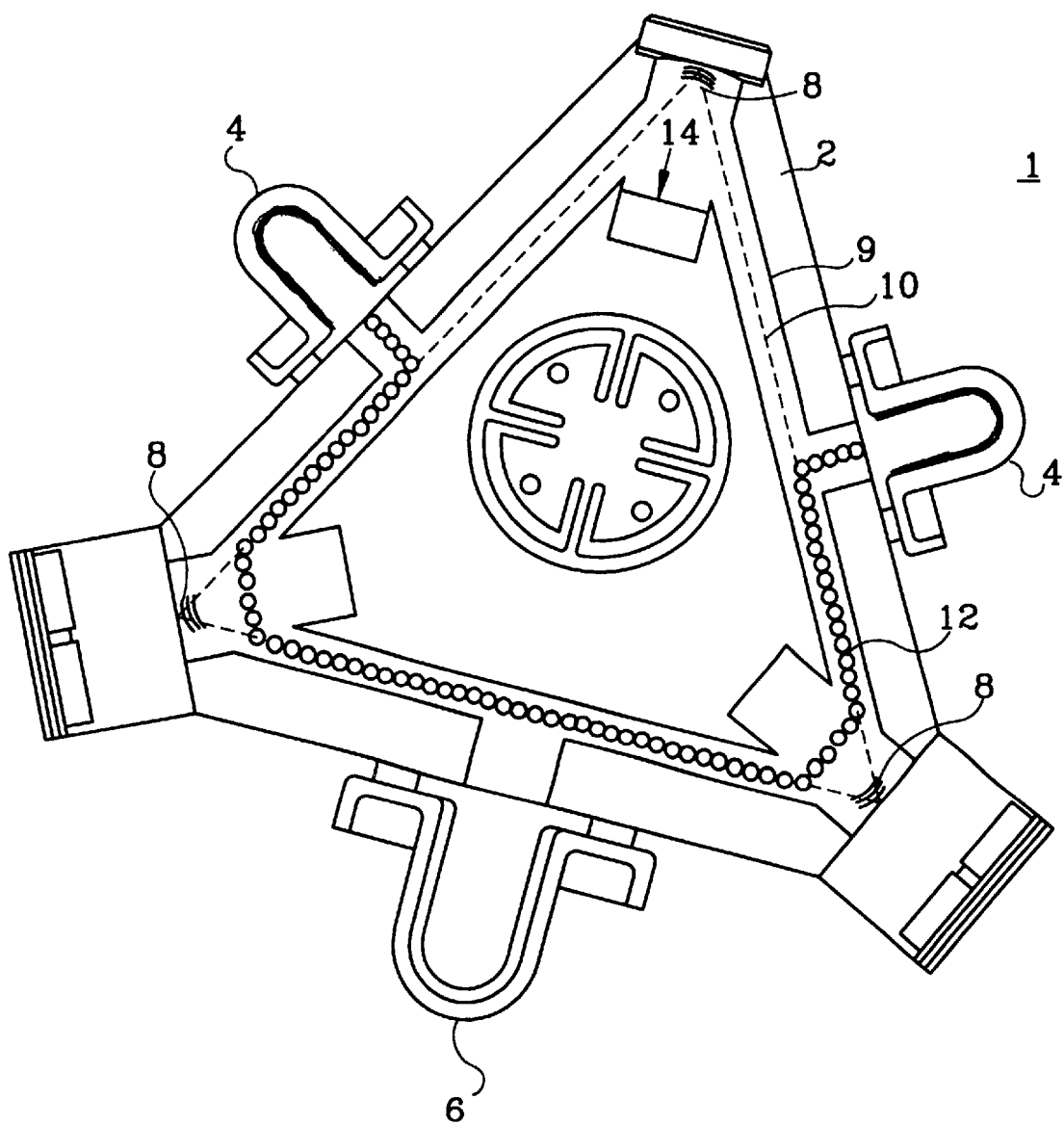
FIG. 2 shows a cut away top view of another embodiment of the present invention.

It is certified that error appears in the above-identified patent and that said Letters Patent is hereby corrected as shown below:

<u>Column 1,</u>
Line 55, before "The process to plate..." insert -- The plating covers the entire electrode. This plating could cover the entire surface of the electrode or only the entire interior of the electrode as shown in Fig. 2. Covering the entire surface or only the interior depends on available resources or other requirements that may be desirable. The plating is a thin layer of material ranging in thickness from 0.00001 to -- 0.0015 inches. --

Signed and Sealed this

Fourth Day of November, 2003

JAMES E. ROGAN
*Director of the United States Patent and Trademark Office*